(12) United States Patent
Vasters (10) Patent No.: US 8,694,462 B2
(45) Date of Patent: Apr. 8, 2014

(54) SCALE-OUT SYSTEM TO ACQUIRE EVENT DATA

(75) Inventor: Clemens Friedrich Vasters, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/278,408

(22) Filed: Oct. 21, 2011

(65) Prior Publication Data

US 2013/0066828 A1     Mar. 14, 2013

Related U.S. Application Data

(60) Provisional application No. 61/533,667, filed on Sep. 12, 2011, provisional application No. 61/533,669, filed on Sep. 12, 2011.

(51) Int. Cl.
    *G06F 17/30*      (2006.01)

(52) U.S. Cl.
    USPC ............................................. 707/609

(58) Field of Classification Search
    USPC ............................................. 707/609
    See application file for complete search history.

(56) References Cited

U.S. PATENT DOCUMENTS

| | | |
|---|---|---|
| 6,298,378 B1 | 10/2001 | Angal |
| 6,751,657 B1 | 6/2004 | Zothner |
| 6,766,368 B1 | 7/2004 | Jakobson |
| 7,062,272 B2 | 6/2006 | Grilli |
| 7,209,955 B1 | 4/2007 | Major |
| 7,243,156 B2 | 7/2007 | Hahn et al. |
| 7,412,461 B2 | 8/2008 | Sholl |
| 7,516,208 B1 | 4/2009 | Kerrison |
| 7,613,721 B2 | 11/2009 | Horvitz et al. |
| 7,617,160 B1 | 11/2009 | Grove et al. |
| 7,617,162 B2 | 11/2009 | Saini |
| 7,676,812 B2 | 3/2010 | Cabrera |
| 7,765,281 B1 | 7/2010 | Crow |
| 7,774,792 B2 | 8/2010 | Anderson et al. |

(Continued)

FOREIGN PATENT DOCUMENTS

| | | |
|---|---|---|
| JP | 2004326480 | 11/2004 |
| KR | 10-2009-001946 | 2/2009 |
| KR | 10-2011-0071828 | 6/2011 |

OTHER PUBLICATIONS

Patel, Jay A., "Exploiting System Diversity in Peer-to-Peer Publish-Subscribe Systems", Dissertation, Submitted in Partial Fulfillment of the Requirements for the Degree of Doctor of Philosophy in Computer Science in the Graduate College of the University of Illinois, May 2009, 124 pages.

(Continued)

*Primary Examiner* — Rehana Perveen
*Assistant Examiner* — Alexander Khong
(74) *Attorney, Agent, or Firm* — Alin Corie; Jim Sfekas; Micky Minhas (57) ABSTRACT

Events can be emitted by a method that includes acquiring data from a plurality of different sources by communicating to the different sources using a plurality of different protocols specific to the different sources and, based on the acquired data, determining that an event should occur. The method can further include causing an event that is normalized for a consistent event evaluation by consumers irrespective of the specific shape of the data from the data source resulting in the event.

20 Claims, 3 Drawing Sheets

(56) References Cited

U.S. PATENT DOCUMENTS

| | | | |
|---|---|---|---|
| 7,797,306 | B1 | 9/2010 | Pather |
| 7,817,544 | B2 | 10/2010 | Zhu |
| 8,428,227 | B2 | 4/2013 | Angel et al. |
| 2001/0038640 | A1 | 11/2001 | McKinnon, III et al. |
| 2002/0129141 | A1 | 9/2002 | Sogabe et al. |
| 2003/0191856 | A1 | 10/2003 | Lewis et al. |
| 2004/0025014 | A1 | 2/2004 | Kaler |
| 2004/0064387 | A1 | 4/2004 | Clarke |
| 2004/0177156 | A1* | 9/2004 | Hahn et al. ............... 709/240 |
| 2004/0203644 | A1 | 10/2004 | Anders |
| 2004/0254993 | A1 | 12/2004 | Mamas |
| 2005/0278416 | A1 | 12/2005 | Kay |
| 2006/0130046 | A1 | 6/2006 | Oneill |
| 2006/0153616 | A1 | 7/2006 | Hofmann |
| 2006/0224772 | A1 | 10/2006 | Saccocio |
| 2006/0235715 | A1 | 10/2006 | Abrams et al. |
| 2007/0094251 | A1 | 4/2007 | Lu et al. |
| 2007/0112635 | A1 | 5/2007 | Loncaric |
| 2007/0112714 | A1 | 5/2007 | Fairweather |
| 2007/0208759 | A1 | 9/2007 | Von Koch et al. |
| 2007/0220558 | A1 | 9/2007 | Jung |
| 2007/0230920 | A1 | 10/2007 | Gasper |
| 2007/0260674 | A1 | 11/2007 | Shenfield |
| 2008/0063154 | A1 | 3/2008 | Tamari |
| 2008/0120432 | A1 | 5/2008 | Lamoureaux et al. |
| 2008/0133395 | A1 | 6/2008 | Jimenez et al. |
| 2008/0285542 | A1 | 11/2008 | Jachner |
| 2008/0301061 | A1 | 12/2008 | Kittelsen |
| 2008/0306970 | A1 | 12/2008 | Gilman |
| 2008/0306984 | A1 | 12/2008 | Friedlander et al. |
| 2009/0132684 | A1* | 5/2009 | Pelley et al. ............. 709/220 |
| 2009/0264102 | A1 | 10/2009 | Parmar |
| 2010/0042519 | A1 | 2/2010 | Dingler et al. |
| 2010/0083124 | A1 | 4/2010 | Druzgalski et al. |
| 2010/0095242 | A1 | 4/2010 | Freeny, Jr. |
| 2010/0114857 | A1 | 5/2010 | Edwards et al. |
| 2010/0227632 | A1 | 9/2010 | Bell |
| 2010/0287295 | A1 | 11/2010 | Schaffa et al. |
| 2011/0029598 | A1 | 2/2011 | Arnold |
| 2011/0125753 | A1 | 5/2011 | Dow et al. |
| 2011/0153349 | A1 | 6/2011 | Anderson et al. |
| 2011/0161167 | A1 | 6/2011 | Jallapuram |
| 2011/0167357 | A1 | 7/2011 | Benjamin et al. |
| 2011/0282949 | A1 | 11/2011 | Rivkin |
| 2011/0321062 | A1 | 12/2011 | Pope et al. |
| 2012/0005025 | A1 | 1/2012 | Aaltonen et al. |
| 2013/0054706 | A1 | 2/2013 | Graham et al. |
| 2013/0067025 | A1 | 3/2013 | Vasters |

OTHER PUBLICATIONS

"Amazon Simple Notification Service (Amazon SNS)", Retrieved on: Sep. 19, 2011, Available at: http://aws.amazon.com/sns/.

Yoon, et al., "On-demand Replication for Failover in Content-based Publish/Subscribe Overlays", In Middleware Systems Reserch Group Technical Report, Nov. 2009, pp. 1-12.

Vasters, Clemens, "Introducing the Windows Azure AppFabric Service Bus May 2011 CTP", Published on: May 16, 2011, Available at: http://vasters.com/clemensv/2011/05/16/Introducing+The+Windows+Azure+AppFabric+Service+Bus+May+2011+CTP.aspx.

Chou, David, "Using Events in Highly Distributed Architectures", In Journal of Microsoft Architecture, Oct. 2008, 10 pages.

U.S. Appl. No. 13/278,313, filed Oct. 21, 2011, Vasters.
U.S. Appl. No. 13/278,401, filed Oct. 21, 2011, Vasters.
U.S. Appl. No. 13/278,415, filed Oct. 21, 2011, Vasters.
U.S. Appl. No. 13/278,418, filed Oct. 21, 2011, Vasters.
U.S. Appl. No. 13/278,422, filed Oct. 21, 2011, Vasters.

Brennan, Patrick, "Adding Push Notifications to your App: Build or Buy?", Sep. 13, 2011, Available at http://blog.w3i.com/2011/09/13/adding-push-notifications-to-your-app-build-or-buy/.

"Apple Push Notification Service", Retrieved on: Sep. 16, 2011, Available at: http://;en.wikipedia.org/wiki/Apple_Push_Notification_Service.

Kiriaty, Yochay, "Understanding Microsoft Push Notifications for Windows Phones", May 3, 2010, Available at: http://windowsteamblog.com/windows_phone/b/wpdev/archive/2010/05/03/understanding-microsoft-push-notifications-for-windows-phones.aspx.

"Introduction to Data Warehousing", Retrieved on Sep. 19, 2011, Available at: http://dataminingtools.net/wiki/introdw.php.

Al-Shaer, Ehab Salem, "A Hierarchical Filtering-based Monitoring Architecture for Large-Scale Distributed Systems", A Dissertation Submitted to the Faculty of Old Dominion University and Partial Fulfillment of the Requirements for the Degree of Doctor of Philosophy, Computer Science, Dec. 1998, 223 pages.

"Yahoo! Sportacular", Retrieved on: Sep. 22, 2011, Available at: http://mobile.yahoo.com/spoets/iphone.

"Windows Phone 7 Development: Push Notifications—Implementing Toast Notifications", Published on: May 17, 2011, Available at: http://programming4.us/mobile/3696.aspx.

Podnar, et al., "Mobile Push: Delivering Content to Mobile Users", In Proceedings of 22nd International Conference on Distributed Computing Systems Workshops, 2002, pp. 563-568.

Thawani, et al., "Context-aware Timely Information Delivery in Mobile Environments", In Proceedings of the Computer Journal, vol. 50, Issue 4, Mar. 13, 2007, pp. 460-472.

Aalto, et al., "Bluetooth and WAP Push Based Location-Aware Mobile Advertising System", In Proceedings of 2nd International Conference on Mobile Systems, Applications, and Services, Jun. 6-9, 2004, pp. 49-58.

"The Data Distribution Service-reducing Cost through Agile Integration", Published on: 2011, Available at least as early as Sep. 23, 2011 at: http://www.ucsarchitecture.org/downloads/DDS%20Exec%20Brief%20v20l-public.pdf.

Roganovic, et al., "A Real-time Traffic Information Service for Efficient Navigation and Transport Management", In Proceedings of AGILE, Apr. 18-22, 2011, 4 pages.

"Customized Notifications", Retrieved on: Sep. 19, 2011, 8 pages, Available at: http://www.ilient.com/Sysforums/templates/default/help/files/CustomNotifications.htm.

Fiege, et al., "Modular Event-Based Systems", In Journal of the Knowledge Engineering Review, vol. 17, Issue 4, Dec. 2002, 43 pages.

Fiege, et al., "Engineering Event-Based Systems with Scopes", In Proceedings of the 16th European Conference on Object-Oriented Programming, vol. 2374, Jun. 2002, pp. 309-333.

Chen, et al., "An Efficient Spatial Publish/Subscribe System for Intelligent Location-Based Services", In Proceedings of 2nd International Workshop on Distributed Event-based Systems, Jun. 8, 2003, pp. 1-6.

Hoffert, et al., "Evaluating Transport Protocols for Real-Time Event Stream Processing Middleware and Applications", In Proceedings of the Confederated International Conferences, CoopIS, DOA, IS, and ODBASE on On the Move to Meaningful Internet Systems, Part I, Nov. 1-6, 2009, pp. 614-633.

Huang, et al., Publish/Subscribe in a Mobile Environment, In Journal of Wireless Networks—Special Issue: Pervasive Computing and Communications, vol. 10, Issue 6, Nov. 2004, pp. 643-652.

Office Action dated Apr. 25, 2013 cited in U.S. Appl. No. 13/278,313.
Office Action dated May 8, 2013 cited in U.S. Appl. No. 13/278,401.
Office Action dated May 16, 2013 cited in U.S. Appl. No. 13/278,422.
Notice of Allowance dated Aug. 20, 2013 cited in U.S. Appl. No. 13/278,427.
Office Action dated Apr. 17, 2013 cited in U.S. Appl. No. 13/278,415.
Office Action dated Feb. 27, 2013 cited in U.S. Appl. No. 13/278,418.
Office Action dated Jun. 27, 2013 cited in U.S. Appl. No. 13/278,427.
Office Action dated Oct. 18, 2013 in U.S. Appl. No. 13/278,422.
Office Action dated Nov. 15, 2013 in U.S. Appl. No. 13/278,313.
Office Action dated Nov. 21, 2013 in U.S. Appl. No. 13/278,418.
Office Action dated Dec. 30, 2013 in U.S. Appl. No. 13/278,415.

* cited by examiner

SCALE-OUT SYSTEM TO ACQUIRE EVENT DATA

CROSS-REFERENCE TO RELATED APPLICATIONS

This application claims the benefit of U.S. Provisional application 61/533,667 filed Sep. 12, 2011, titled "SCALE-OUT SYSTEM TO ACQUIRE EVENT DATA FROM A VARIETY OF SOURCES AT SCALE" and U.S. Provisional application 61/533,669 filed Sep. 12, 2011, titled "SYSTEM TO DISTRIBUTE MOBILE PUSH NOTIFICATIONS SOURCED FROM A VARIETY OF EVENT SOURCES TARGETS WITH CUSTOMIZED MAPPING OF EVENT DATA TO NOTIFICATIONS" which are incorporated herein by reference in their entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Many computers are intended to be used by direct user interaction with the computer. As such, computers have input hardware and software user interfaces to facilitate user interaction. For example, a modern general purpose computer may include a keyboard, mouse, touchpad, camera, etc for allowing a user to input data into the computer. In addition, various software user interfaces may be available.

Examples of software user interfaces include graphical user interfaces, text command line based user interface, function key or hot key user interfaces, and the like.

Assume a developer who is writing an application that aims to aggregate information from a broad variety of sources, such as current world or financial news available in RSS or Atom formats, and channel this information through a publish/subscribe infrastructure for consolidation, dissemination, or storage. Publish/subscribe infrastructures are provided by Windows Azure Service Bus available from Microsoft Corporation of Redmond Wash., but also exist in similar form in various other messaging systems and allow to publish messages/events into temporary storage and have those messages/events be retrieved and consumed by one or multiple subscribers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of emitting events. The method includes acquiring data from a plurality of different sources by communicating to the different sources using a plurality of different protocols specific to the different sources. The method further includes, based on the acquired data, determining that an event should occur. The method further includes causing an event. The caused event is normalized for a consistent event evaluation by consumers irrespective of the specific shape of the data from the data source resulting in the event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may implement a scale-out acquisition infrastructure that can collect and normalize event data from a broad variety and large number of sources. For example, data may be acquired from a number of different sources using protocols appropriate to each of those sources. The data may be normalized into an event format that is consistent irrespective of where the data for the event was obtained from, and in what format the data was obtained. This may allow these events to be submitted into a publish/subscribe infrastructure and allow consumers to treat the collected events in a uniform fashion.

Some embodiments may implement mechanism to manage a partitioned pool of source descriptions across distributed stores and schedule acquisition of events from the described sources using a common scheduler framework.

Some embodiments may implement mechanism to assign and reassign ownership of acquisition jobs to acquisition workers based on a combination of partitioned ownership and use of scheduled messaging.

Some embodiments may implement mechanism to activate and deactivate sources based on the needs of the consuming audience.

Some embodiments may implement mechanism to handle temporary and permanent errors and blacklisting of sources As a foundation, one embodiment system is using a publish/subscribe infrastructure as provided by Windows Azure Service Bus available from Microsoft Corporation of Redmond Wash., but which also exists in similar form in various other messaging systems. The infrastructure provides two capabilities that facilitate the described implementation of the presented method: Topics and Queues.

A Queue is a storage structure for messages that allows messages to be added (enqueued) in sequential order and to be removed (dequeued) in the same order as they have been added. Messages can be added and removed by any number of concurrent clients, allowing for leveling of load on the enqueue side and balancing of processing load across receivers on the dequeue side. The queue also allows entities to obtain a lock on a message as it is dequeued, allowing the consuming client explicit control over when the message is actually deleted from the queue or whether it may be restored into the queue in case the processing of the retrieved message fails.

A Topic is a storage structure that has all the characteristics of a Queue, but allows for multiple, concurrently existing 'subscriptions' which each allow an isolated, filtered view over the sequence of enqueued messages. Each subscription on a Topic yields a copy of each enqueued message provided that the subscription's associated filter condition(s) positively match the message. As a result, a message enqueued into a Topic with 10 subscriptions where each subscription has a simple 'passthrough' condition matching all messages, will yield a total of 10 messages, one for each subscription. A subscription can, like a Queue, have multiple concurrent consumers providing balancing of processing load across receivers.

Another foundational concept is that of 'event', which is, in terms of the underlying publish/subscribe infrastructure just a message. In the context of one embodiment, the event is subject to a set of simple constraints governing the use of the message body and message properties. The message body of an event generally flows as an opaque data block and any event data considered by one embodiment generally flows in message properties, which is a set of key/value pairs that is part of the message representing the event.

Figure 1:
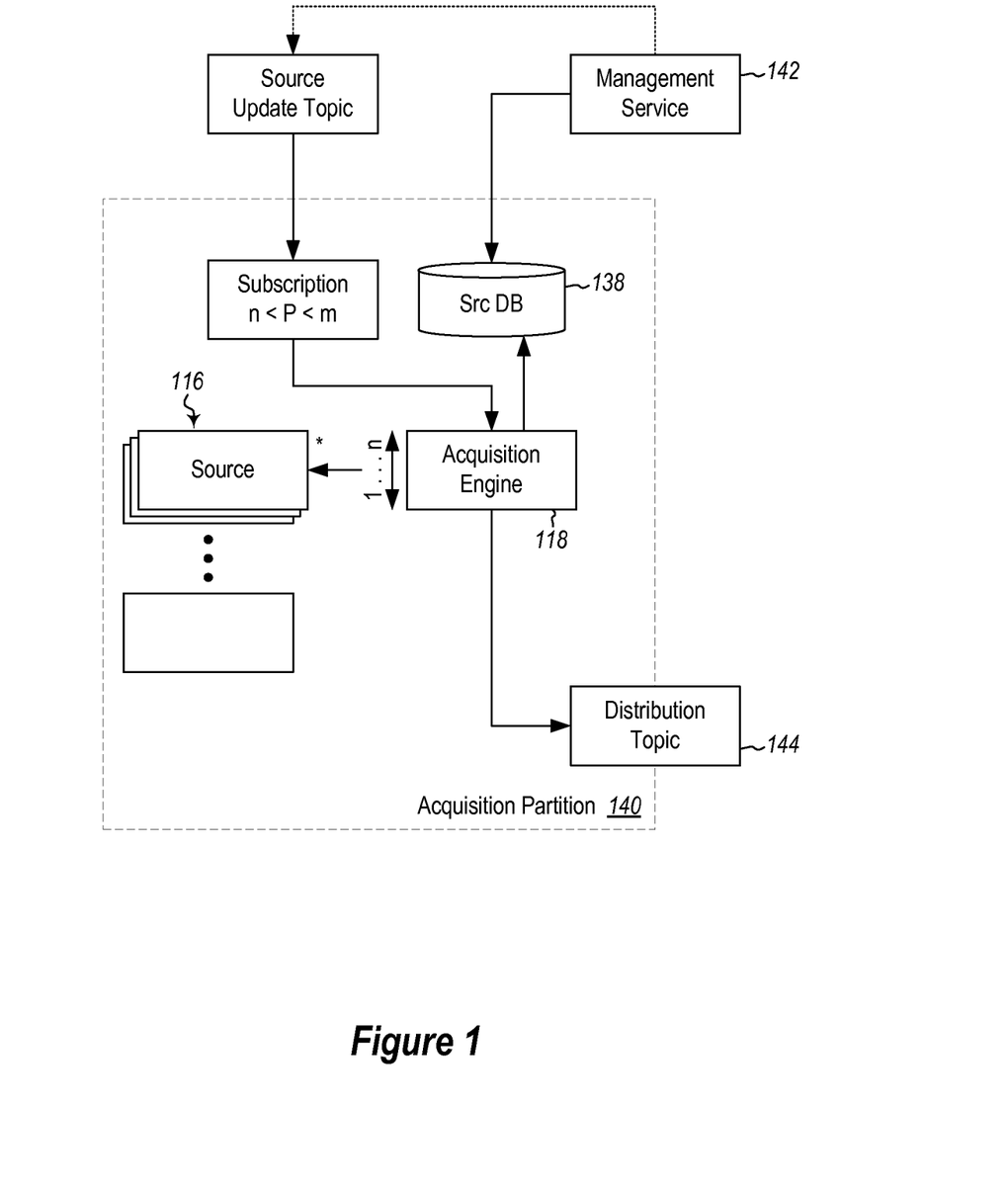
FIG. 1 illustrates an example of an event data acquisition system.

Referring now to FIG. 1, one embodiment architecture's goal is to acquire event data from a broad variety of different sources 116 at large scale and forward these events into a publish/subscribe infrastructure for further processing. The processing may include some form of analysis, real time search, or redistribution of events to interested subscribers through pull or push notification mechanisms.

One embodiment architecture defines an acquisition engine 118, a model for acquisition adapters and event normalization, a partitioned store 138 for holding metadata about acquisition sources 116, a common partitioning and scheduling model, and a model for how to flow user-initiated changes of the state of acquisition sources 116 into the system at runtime and without requiring further database lookups.

In a concrete implementation, the acquisition may support concrete acquisition adapters to source events from a broad variety of public and private networked services, including RSS, Atom, and OData feeds, email mailboxes including but not limited to such supporting the IMAP and POP3 protocols, social network information sources 116 like Twitter timelines or Facebook walls, and subscriptions on external publish/subscribe infrastructures like Windows Azure Service Bus or Amazon's Simple Queue Service.

Event Normalization

Event data is normalized to make events practically consumable by subscribers on a publish/subscribe infrastructure that they are being handed off to. Normalization means, in this context, that the events are mapped onto a common event model with a consistent representation of information items that may be of interest to a broad set of subscribers in a variety of contexts. The chosen model here is a simple representation of an event in form of a flat list of key/value pairs that can be accompanied by a single, opaque, binary chunk of data not further interpreted by the system. This representation of an event is easily representable on most publish/subscribe infrastructures and also maps very cleanly to common Internet protocols such as HTTP.

Figure 2:
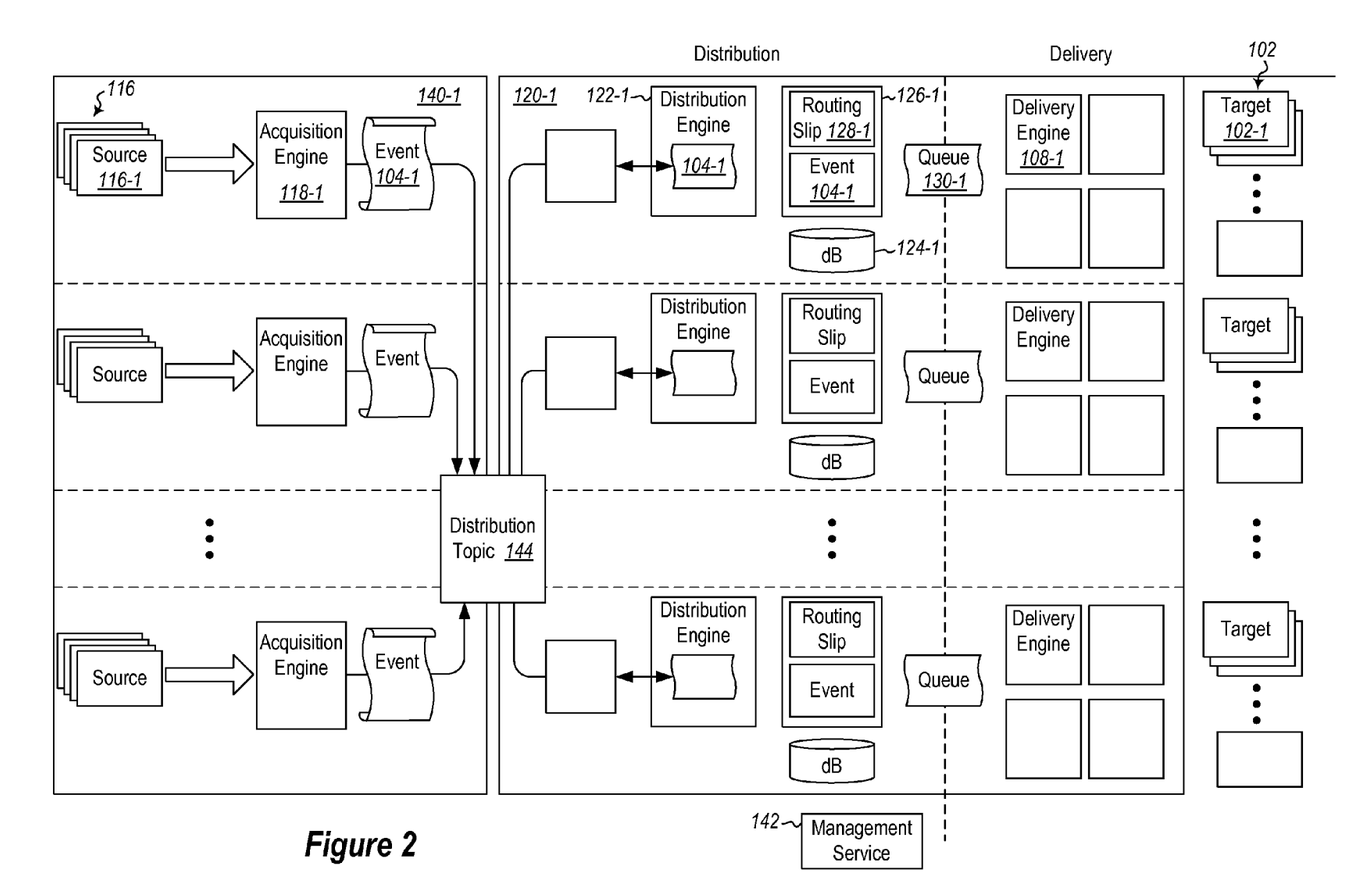
FIG. 2 illustrates an event data acquisition and distribution system.

To illustrate the event normalization, consider the mapping of an RSS or Atom feed entry into an event 104 (see FIGS. 1 and 2). RSS and Atom are two Internet standards that are very broadly used to publish news and other current information, often in chronological order, and that aids in making that information available for processing in computer programs in a structured fashion. RSS and Atom share a very similar structure and a set of differently named but semantically identical data elements. So a first normalization step is to define common names as keys for such semantically identical elements that are defined in both standards, like a title or a synopsis. Secondly, data that only occurs in one but not in the other standard is usually mapped with the respective 'native' name. Beyond that, these kinds of feeds often carry 'extensions', which are data items that are not defined in the core standard, but are using extensibility facilities in the respective standards to add additional data.

Some of these extensions, including but not limited to GeoRSS for geolocation or OData for embedding structured data into Atom feeds are mapped in a common way that is shared across different event sources 116, so that the subscriber on the publish/subscribe infrastructure that the events are emitted to can interpret geolocation information in a uniform fashion irrespective of whether the data has been acquired from RSS or Atom or a Twitter timeline. Continuing with the GeoRSS example, a simple GeoRSS expression representing a geography 'point' can thus be mapped to a pair of numeric 'Latitude'/'Longitude' properties representing WGS84 coordinates.

Extensions that carry complex, structured data such as OData may implement a mapping model that preserves the complex type structure and data without complicating the foundational event model. Some embodiments normalize to a canonical and compact complex data representation like JSON and map a complex data property, for instance an OData property 'Tenant' of a complex data type 'Person' to a key/value pair where the key is the property name 'Tenant' and the value is the complex data describing the person with name, biography information, and address information represented in a JSON serialized form. If the data source is an XML document, as it is in the case of RSS or Atom, the value may be created by transcribing the XML data into JSON preserving the structure provided by XML, but flattening out XML particularities like attributes and element, meaning that both XML attributes and elements that are subordinates of the same XML element node are mapped to JSON properties as 'siblings' with no further differentiation.

Sources and Partitioning

One embodiment architecture captures metadata about data sources 116 in 'source description' records, which may be stored in the source database 138. A 'source description' may have a set of common elements and a set of elements specific to a data source. Common elements may include the source's name, a time span interval during which the source 116 is considered valid, a human readable description, and the type of the source 116 for differentiation. Source specific elements depend on the type of the source 116 and may include a network address, credentials or other security key material to gain access to the resource represented by the address, and metadata that instructs the source acquisition adapter to either perform the data acquisition in a particular manner, like providing a time interval for checking an RSS feed, or to perform forwarding of events in a particular manner, such as spacing events acquired from a current events news feed at least 60 seconds apart so that notification recipients get the chance to see each breaking news item on a constrained screen surface if that is the end-to-end experience to be constructed.

The source descriptions are held in one or multiple stores, such as the source database 138. The source descriptions may be partitioned across and within these stores along two different axes.

The first axis is a differentiation by the system tenant. System tenants or 'namespaces' are a mechanism to create isolated scopes for entities within a system. Illustrating a concrete case, if "Fred" is a user of a system implementing one embodiment, Fred will be able to create a tenant scope which provides Fred with an isolated, virtual environment that can hold source descriptions and configuration and state entirely independent of other sources 116 in the system. This axis may serve as a differentiation factor to spread source descriptions across stores, specifically also in cases where a tenant requires isolation of the stored metadata (which may include security sensitive data such as passwords), or for technical, regulatory or business reasons. A system tenant may also represent affinity to a particular datacenter in which the source description data is held and from where data acquisition is to be performed.

The second axis may be a differentiation by a numeric partition identifier chosen from a predefined identifier range. The partition identifier may be derived from invariants contained in the source description, such as for example, the source name and the tenant identifier. The partition identifier may be derived from these invariants using a hash function (one of many candidates is the Jenkins Hash, see http://www.burtleburtle.net/bob/hash/doobs.html) and the resulting hash value is computed down into the partition identifier range, possibly using a modulo function over the hash value. The identifier range is chosen to be larger (and can be substantially larger) than the largest number of storage partitions expected to be needed for storing all source descriptions to be ever held in the system.

Introducing storage partitions is commonly motivated by capacity limits, which are either immediately related to storage capacity quotas on the underlying data store or related to capacity limits affecting the acquisition engine 118 such as bandwidth constraints for a given datacenter or datacenter section, which may result in embodiments creating acquisition partitions 140 that are utilizing capacity across different datacenters or datacenter segments to satisfy the ingress bandwidth needs. A storage partition owns a subset of the overall identifier range and the association of a source description record with a storage partition (and the resources needed to access it) can be thus be directly inferred from its partition identifier.

Beyond providing a storage partitioning axis, the partition identifier is also used for scheduling or acquisition jobs and clearly defining the ownership relationship of an acquisition partition 140 to a given source description (which is potentially different from the relationship to the storage partition).

Ownership and Acquisition Partitions

Each source description in the system may be owned by a specific acquisition partition 140. Clear and unique ownership is used because the system does not acquire events from the exact same source 116 in multiple places in parallel as this may cause duplicate events to be emitted. To make this more concrete, one RSS feed defined within the scope of a tenant is owned by exactly one acquisition partition 140 in the system and within the partition there is one scheduled acquisition run on the particular feed at any given point in time.

An acquisition partition 140 gains ownership of a source description by way of gaining ownership of a partition identifier range. The identifier range may be assigned to the acquisition partition 140 using an external and specialized partitioning system that may have failover capabilities and can assign master/backup owners, or using a simpler mechanism where the partition identifier range is evenly spread across the number of distinct compute instances assuming the acquisition engine role. In a more sophisticated implementation with an external partitioning system, the elected master owner for a partition is responsible for seeding the scheduling of jobs if the system starts from a 'cold' state, meaning that the partition has not had a previous owner. In the simpler scenario, the compute instance owning the partition owns seeding the scheduling.

Scheduling

The scheduling needs for acquisition jobs depend on the nature of the concrete source, but there are generally two kinds of acquisition models that are realized in some described embodiments.

In a first model, the owner initiates some form of connection or long-running network request on the source's network service and waits for data to be returned on the connection in form of datagrams or a stream. In the case of a long-running request, commonly also referred to as long-polling, the source network service will hold on to the request until a timeout occurs or until data becomes available—in turn, the acquisition adapter will wait for the request to complete with or without a payload result and then reissue the request. As a result, this acquisition scheduling model has the form of a 'tight' loop that gets initiated as the owner of the source 116 learns about the source, and where a new request or connection is initiated immediately as the current connection or request completes or gets temporarily interrupted. As the owner is in immediate control of the tight loop, the loop can be reliably kept alive while the owner is running. If the owner stops and restarts, the loop also restarts. If the ownership changes, the loop stops and the new owner starts the loop.

In a second model, the source's network service does not support long-running requests or connections yielding data as it becomes available, but are regular request/response services that return immediately whenever queried. On such services, and this applies to many web resources, requesting data in a continuous tight loop causes an enormous amount of load on the source 116 and also causes significant network traffic that either merely indicates that the source 116 has not changed, or that, in the worst case, carries the same data over and over again. To balance the needs of timely event acquisition and not overload the source 116 with fruitless query traffic, the acquisition engine 118 will therefore execute requests in a 'timed' loop, where requests on the source 116 are executed periodically based on an interval that balances those considerations and also takes hints from the source 116 into account. The 'timed' loop gets initiated as the owner of the source 116 learns about the source.

There are two noteworthy implementation variants for the timed loop. The first variant is for low-scale, best-effort scenarios and uses a local, in-memory timer objects for scheduling, which cause the scale, control and restart characteristics to be similar to those of a tight loop. The loop gets initiated and immediately schedules a timer callback causing the first iteration of the acquisition job to run. As that job completes (even with an error) and it is determined that the loop shall continue executing, another timer callback is scheduled for the instant at which the job shall be executed next.

The second variant uses 'scheduled messages', which is a feature of several publish/subscribe systems, including Windows Azure™ Service Bus. The variant provides significantly higher acquisition scale at the cost of somewhat higher complexity. The scheduling loop gets initiated by the owner and a message is placed into the acquisition partition's scheduling queue. The message contains the source description. It is subsequently picked up by a worker which performs the acquisition job and then enqueues the resulting event into the target publish/subscribe system. Lastly, it also enqueues a new 'scheduled' message into the scheduling queue. That message is called 'scheduled' since it is marked with a time instant at which it becomes available for retrieval by any consumer on the scheduling queue.

In this model, an acquisition partition 140 can be scaled out by having one 'owner' role that primarily seeds scheduling and that can be paired with any number of 'worker' roles that perform the actual acquisition jobs.

Source Updates

As the system is running, the acquisition partitions 140 need to be able to learn about new sources 116 to observe and about which sources 116 shall no longer be observed. The decision about this typically lies with a user, except in the case of blacklisting a source 116 (as described below) due to a detected unrecoverable or temporary error, and is the result of an interaction with a management service 142. To communicate such changes, the acquisition system maintains a 'source update' topic in the underlying publish/subscribe infrastructure. Each acquisition partition 140 has a dedicated subscription on the topic with the subscription having a filter condition that constrains the eligible messages to those that carry a partition identifier within the acquisition partition's owned range. This enables the management service 142 to set updates about new or retired sources 116 and send them to the correct partition 140 without requiring knowledge of the partition ownership distribution.

The management service 142 submits update commands into the topic that contain the source description, the partition identifier (for the aforementioned filtering purpose), and an operation identifier which indicates whether the source 116 is to be added or whether the source 116 is removed from the system.

Once the acquisition partition 140 owner has retrieved a command message, it will either schedule a new acquisition loop for a new source 116 or it will interrupt and suspend or even retire the existing acquisition loop.

Blacklisting

Sources 116 for which the data acquisition fails may be temporarily or permanently blacklisted. A temporary black-listing is performed when the source 116 network resource is unavailable or returns an error that is not immediately related to the issued acquisition request. The duration of a temporary blacklisting depends on the nature of the error. Temporary blacklisting is performed by interrupting the regular scheduling loop (tight or timed) and scheduling the next iteration of the loop (by ways of callback or scheduled message) for a time instant when the error condition is expected to be resolved by the other party.

Permanent blacklisting is performed when the error is determined to be an immediate result of the acquisition request, meaning that the request is causing an authentication or authorization error or the remote source 116 indicates some other request error. If a resource is permanently blacklisted, the source 116 is marked as blacklisted in the partition store and the acquisition loop is immediately aborted. Reinstating a permanently blacklisted source 116 requires removing the blacklist marker in the store, presumably along with configuration changes that cause a behavior change for the request, and restarting the acquisition loop via the source update topic.

Referring now to FIG. 2, an alternative example of a system is illustrated. FIG. 2 illustrates an example where information from a large number of different sources is delivered to a large number of different targets. In some examples, information from a single source, or information aggregated from multiple sources, may be used to create a single event that is delivered to a large number of the targets. This may be accomplished, in some embodiments, using a fan-out topology as illustrated in FIG. 2 attached hereto.

FIG. 2 illustrates the sources 116. As will be discussed later herein, embodiments may utilize acquisition partitions 140. Each of the acquisition partitions 140 may include a number of sources 116. There may be potentially a large number and a diversity of sources 116. The sources 116 provide information. Such information may include, for example but not limited to, email, text messages, real-time stock quotes, real-time sports scores, news updates, etc.

FIG. 2 illustrates that each partition includes an acquisition engine, such as the illustrative acquisition engine 118. The acquisition engine 118 collects information from the sources 116, and based on the information, generates events. In the example illustrated in FIG. 2, a number of events are illustrated as being generated by acquisition engines using various sources. An event 104-1 is used for illustration. In some embodiments, the event 104-1 may be normalized as explained further herein. The acquisition engine 118 may be a service on a network, such as the Internet, that collects information from sources 116 on the network.

FIG. 2 illustrates that the event 104-1 is sent to a distribution topic 144. The distribution topic 144 fans out the events to a number of distribution partitions. Distribution partition 120-1 is used as an analog for all of the distribution partitions. The distribution partitions each service a number of end users or devices represented by subscriptions. The number of subscriptions serviced by a distribution partition may vary from that of other distribution partitions. In some embodiments, the number of subscriptions serviced by a partition may be dependent on the capacity of the distribution partition. Alternatively or additionally, a distribution partition may be selected to service users based on logical or geographical proximity to end users. This may allow alerts to be delivered to end users in a more timely fashion.

In the illustrated example, distribution partition 120-1 includes a distribution engine 122-1. The distribution engine 122-1 consults a database 124-1. The database 124-1 includes information about subscriptions with details about the associated delivery targets 102. In particular, the database may include information such as information describing platforms for the targets 102, applications used by the targets 102, network addresses for the targets 102, user preferences of end users using the targets 102, etc. Using the information in the database 124-1, the distribution engine 122-1 constructs a bundle 126-1, where the bundle 126-1 includes the event 104 (or at least information from the event 104) and a routing slip 128-1 identifying a plurality of targets 102 from among the targets 102 to which information from the event 104-1 will be sent as a notification. The bundle 126-1 is then placed in a queue 130-1.

The distribution partition 120-1 may include a number of delivery engines. The delivery engines dequeue bundles from the queue 103-1 and deliver notifications to targets 102. For example, a delivery engine 108-1 can take the bundle 126-1 from the queue 13-1 and send the event 104 information to the targets 102 identified in the routing slip 128-1. Thus, notifications 134 including event 104-1 information can be sent from the various distribution partitions to targets 102 in a number of different formats appropriate for the different targets 102 and specific to individual targets 102. This allows individualized notifications 134, individualized for individual targets 102, to be created from a common event 104-1 at the edge of a delivery system rather than carrying large numbers of individualized notifications through the delivery system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
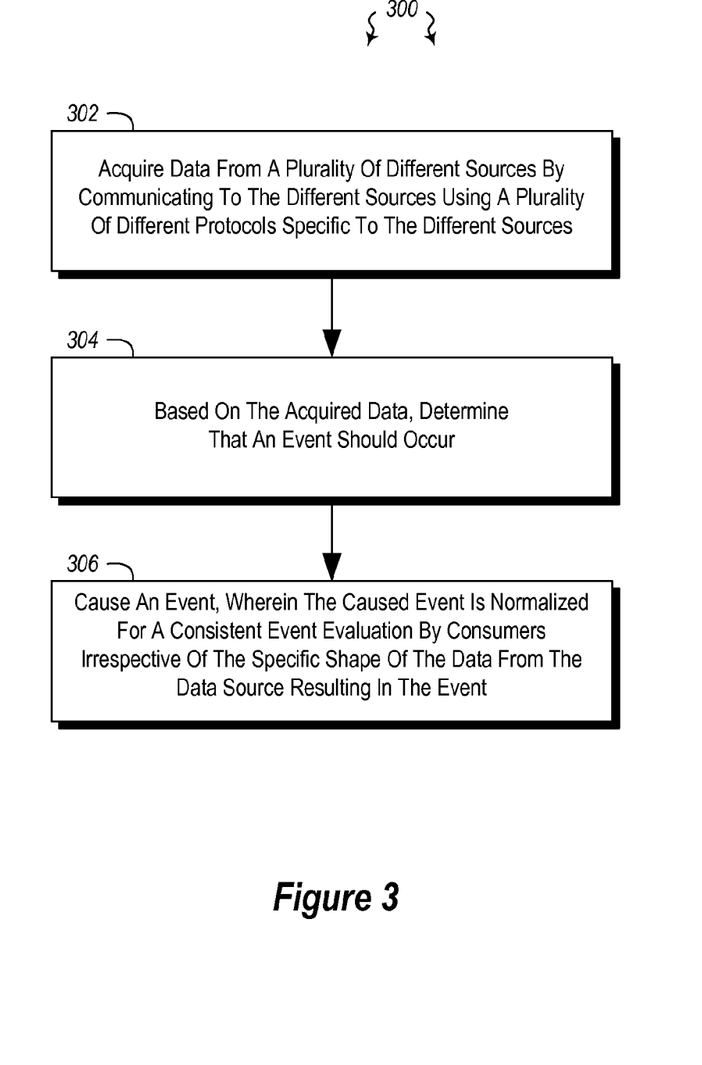
FIG. 3 illustrates a method of emitting event.

Referring now to FIG. 3, a method 300 is illustrated. The method includes acts for emitting events. The method includes acquiring data from a plurality of different sources by communicating to the different sources using a plurality of different protocols specific to the different sources (act 302). For example, FIG. 2 illustrates an acquisition engine 118, that can be used to acquire data from sources 116. Each of the sources 116 may communicate using a different protocol with the acquisition engine 118.

The method 300 further includes based on the acquired data, determining that an event should occur (act 304). For example, a determination may be made, based on information from one or more sources, that a stock quote price has changed, a sports score has changed, an email has arrived, a text message has been sent, etc. Based on this change in information, it may be determined that an event should be emitted.

The method 300 further includes causing an event, wherein the caused event is normalized for a consistent event evaluation by consumers irrespective of the specific shape of the data from the data source resulting in the event (act 306). For example, FIG. 2 illustrates a normalized event 104 being emitted from the acquisition engine. The normalized event may have a consistent format irrespective of which of the sources 116 the information causing the event 104 came from.

The method 300 may be practiced where the event comprises key value pairs, and wherein normalizing the event comprises semantically mapping values from the acquired data corresponding to keys in the acquired data to matching keys in the normalized event. For example, an event may have a key "title" and the value of the title as the key value pair. Data from the source may also have key value pairs, where one of the keys is "title". This can be mapped straight across from the information from the sources 116 to the event 104. Semantically mapping may include performing an explicit semantic mapping. Semantic mapping may include matching key labels between the acquired data and the event. Semantic mapping may include referencing a description of a key value pair in the acquired data. For example, a description may define what data means. This description can be used to map data. Semantically mapping may include performing an implicit semantic mapping.

The method 300 may be practiced where acquiring comprises acquiring and storing metadata from the sources to facilitate normalizing events.

Methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of emitting events, the method comprising:
   a computing system acquiring data from a plurality of different sources by communicating to the different sources using a plurality of different protocols specific to the different sources, the computing system having a processor and stored computer-executable instructions for implementing the method;
   based on the acquired data, the computing system determining that an event should occur, the event comprising a message containing the acquired data being provided to one or more queues for delivery to one or more subscribers; and
   the computing system causing the event by providing the message with the acquired data to the one or more queues, wherein the acquired data undergoes a normalization process prior to being provided to the one or more subscribers, the normalization process including:
      detecting semantically identical elements in the acquired data from the plurality of different sources that are named differently by the different sources but which are semantically identical;
      defining all of the detected the semantically identical elements with a common name, the common name comprising a key; and
      associating the key of each acquired data item with a corresponding value, the corresponding value comprising a data block from the acquired data that includes at least some data that is not modified by the computing system.

2. The method of claim 1, wherein the associating comprises performing an explicit semantic mapping.

3. The method of claim 2, wherein performing an explicit semantic mapping comprises matching key labels between the acquired data and the event.

4. The method of claim 2, wherein performing an explicit semantic mapping comprises referencing a description of a key value pair in the acquired data.

5. The method of claim 1, wherein the associating comprises performing an implicit semantic mapping.

6. The method of claim 1 wherein acquiring comprises acquiring and storing metadata from the sources to facilitate normalizing events.

7. One or more storage devices comprising computer executable instructions that when executed by one or more processors cause the one or more processors to perform the following:
   a computing system acquiring data from a plurality of different sources by communicating to the different sources using a plurality of different protocols specific to the different sources, the computing system having a processor and stored computer-executable instructions for implementing the method;
   based on the acquired data, the computing system determining that an event should occur, the event comprising a message containing the acquired data being provided to one or more queues for delivery to one or more subscribers; and the computing system causing the event by providing the message with the acquired data to the one or more queues, wherein the acquired data undergoes a normalization process prior to being provided to the one or more subscribers, the normalization process including:
      creating a key and a value pairing for the acquired data, wherein the key comprises a name associated with the acquired data and the value comprises a data block from the acquired data that includes at least some data that is not modified by the computing system.

8. The one or more storage devices of claim 7, wherein the creating includes identifying semantically identical elements in the acquired data and performing an explicit semantic mapping of the acquired data.

9. The one or more storage devices of claim 8, wherein performing an explicit semantic mapping comprises matching key labels between the acquired data and the event.

10. The one or more storage devices of claim 8, wherein performing an explicit semantic mapping comprises referencing a description of a key value pair in the acquired data.

11. The one or more storage devices of claim 7, wherein the creating includes identifying semantically identical elements in the acquired data and performing an implicit semantic mapping of the acquired data.

12. The one or more storage devices of claim 7 wherein acquiring comprises acquiring and storing metadata from the sources to facilitate normalizing events.

13. A computing system for emitting events, the computing system comprising:
   at least one processor; and
   one or more storage devices having stored computer executable instructions that when executed by one or more processors, implement the following:
      the computing system acquiring data from a plurality of different sources by communicating to the different sources using a plurality of different protocols specific to the different sources, the computing system having a processor and stored computer-executable instructions for implementing the method;

based on the acquired data, the computing system determining that an event should occur, the event comprising a message containing the acquired data being provided to one or more queues for delivery to one or more subscribers; and the computing system causing the event by providing the message with the acquired data to the one or more queues, wherein the acquired data undergoes a normalization process prior to being provided to the one or more subscribers, the normalization process including:

creating a key and a value pairing for the acquired data, wherein the key comprises a name associated with the acquired data and the value comprises a data block from the acquired data that includes at least some data that is not modified by the computing system; and the creating including detecting semantically identical elements in the acquired data from the plurality of different sources that are named differently by the different sources but which are semantically identical and defining all of the detected the semantically identical elements with a common name, the common name comprising the key.

14. The computing system of claim 13, wherein the creating further includes performing an explicit semantic mapping with the key of each acquired data item.

15. The computing system of claim 14, wherein performing an explicit semantic mapping comprises matching key labels between the acquired data and the event.

16. The computing system of claim 14, wherein performing an explicit semantic mapping comprises referencing a description of a key value pair in the acquired data.

17. The computing system of claim 13, wherein the associating comprises performing an implicit semantic mapping with the key of each acquired data item.

18. The computing system as recited in claim 13, wherein the method further includes:

identifying unique elements in the acquired data from the plurality of different sources that are not semantically identical to other elements from the acquired data; and assigning the unique elements with a native name that is native to the protocol used by a corresponding origin source.

19. The computing system as recited in claim 13, wherein the computing system performs the normalization process prior to providing the message with the acquired data to the one or more queues, the one or more queues comprising a distribution topic, the distribution topic comprising a queue for a plurality of concurrently existing subscriptions to the distribution topic and over which each subscription has a filtered view over enqueued messages within the distribution topic.

20. The computing system as recited in claim 13, wherein the determining the event should occur comprises detecting a change in the acquired data.

* * * * *